J. Curtis,
Wire Choker Trap,
No. 69,777. Patented Oct. 15, 1867.
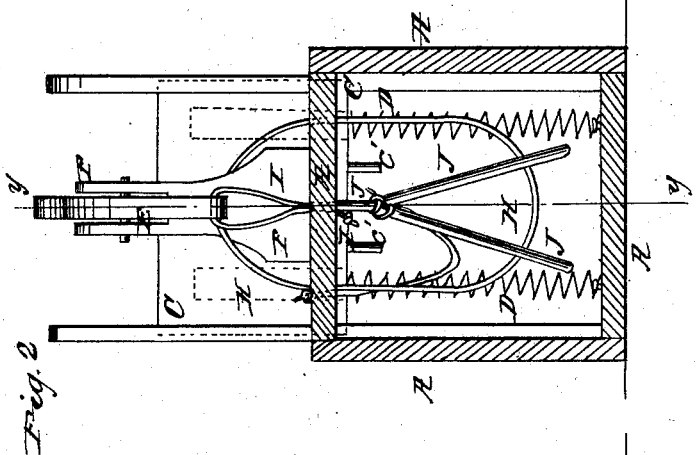
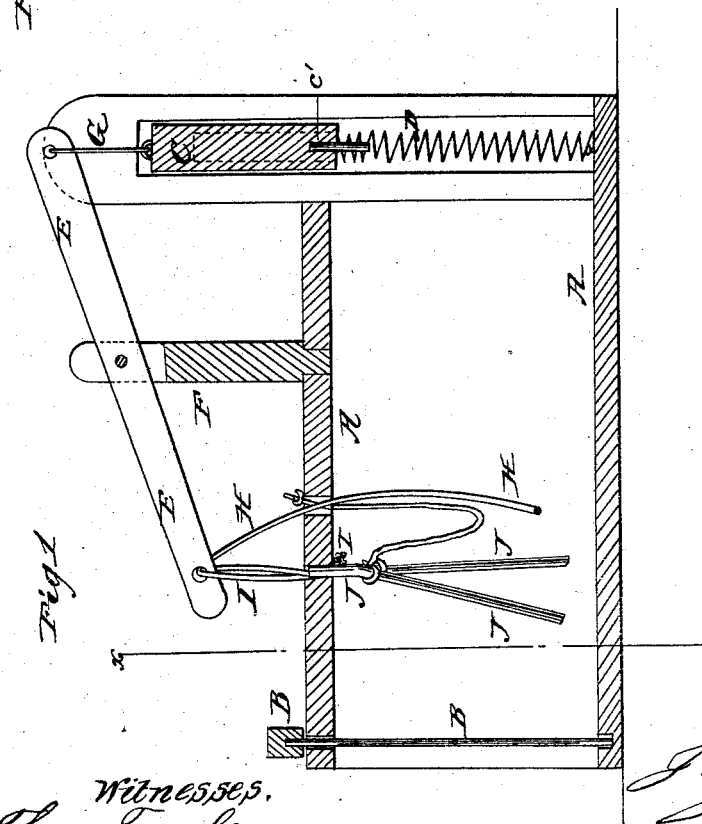
Witnesses.
Theo Tusche
Wm Trewrn
Inventor.
John Curtis
per Munn H
Attorneys

United States Patent Office.

JOHN CURTIS, OF ST. CHARLES, MINNESOTA.

Letters Patent No. 69,777, dated October 15, 1867.

IMPROVEMENT IN ANIMAL TRAPS.

*The Schedule referred to in these Letters Patent and making part of the same.*

TO ALL WHOM IT MAY CONCERN:

Be it known that I, JOHN CURTIS, of St. Charles, in the county of Winona, and State of Minnesota, have invented a new and improved Gopher Trap; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved trap, taken through the line $y\,y$, fig. 2.

Figure 2 is a vertical cross-section of the same, taken through the line $x\,x$, fig. 1.

Similar letters of reference indicate like parts.

My invention has for its object to furnish an improved trap for catching gophers, which shall be simple in construction and effective in operation; and it consists in the combination of the sliding gate, springs, lever, wire loop, cord, and forked rod, with each other and with the box of the trap, the whole being constructed and arranged as hereinafter more fully described.

A is the box of the trap, one end of which is closed with the wire grate B, sliding in vertical grooves in the side boards of the trap. The other end of the box is closed with a sliding gate, C. D are springs, the lower ends of which are secured to the bottom of the trap, and their upper ends are secured to the lower edge of the gate C, so that they may draw the said gate down by their elasticity, and close the trap. C' are wires, which may be attached to the lower edge of the gate C, to fill out the space between the springs D, when the gate is down. E is a lever, pivoted to the support F, attached to the top of the box A. The rear end of the lever E is connected to the upper edge of the gate C by the link or short connecting-rod G. To the forward end of the lever E is attached a wire loop, H, which passes down through holes in the top of the box A, and hangs suspended in the interior of said box. To the forward end of the lever E is also attached a cord, I, having a knot formed upon its free end, of such a size that it may be passed easily through a hole in the top of the box A. The trap is set by operating the lever E to raise the sliding spring gate C; the end of the cord I is then passed down through the hole in the top of the box A, and the end of the forked rod J is passed into the said hole, above the knot, upon the cord I. This may be easily done by r moving the wire grate B, which is returned to its place as soon as the trap is set. The side of the gopher hole is then opened, and the end of the trap, in which is the gate C, is placed in it, and made dark, the other end of the trap being left open to admit the light. As soon as the gopher sees the light he makes for it to close the hole. In passing through the trap he strikes against the forked rod J and knocks it down. The springs D then draw down the gate C, operating the lever E, and raising the wire loop H, which catches him around the body and holds him securely. The inner surface of the box A should be lined with tin or some other metal plate, so that should the gopher miss being caught by the loop H, or escape from it, he may be unable to gnaw his way out of the trap.

I claim as new, and desire to secure by Letters Patent—

The combination of the sliding gate C, springs D, lever E, wire loop H, cord I, and forked rod J, or its equivalent, with each other and with the box A. substantially as herein shown and described, and for the purpose set forth.

JOHN CURTIS.

Witnesses:
A. W. EVERITT,
HENRY TALBOT.